United States Patent Office 3,758,329
Patented Sept. 11, 1973

3,758,329
METHOD OF COATING METAL, GLASS OR SYNTHETIC RESIN FILAMENTS WITH A HEAT-SOFTENABLE MATERIAL
Bordie B. Garick, Newark, Ohio, assignor to Owens-Corning Fiberglas Corporation
Continuation of abandoned application Ser. No. 777,001, Nov. 19, 1968. This application May 24, 1971, Ser. No. 146,429
Int. Cl. C03c 25/02; B44d 1/09, 1/22, 1/42
U.S. Cl. 117—126 GM
19 Claims

ABSTRACT OF THE DISCLOSURE

A method of achieving complete enveloping coating of metal, glass or synthetic resin fibers by a heat-softenable material, wherein a plurality of said filaments are moved downwardly past a marginal exposed edge of a reservoir pool of softened heat-softenable material and to pick up an amount of the softened heat-softenable material and thence continuously move downwardly into contact with a surface or member, causing the heat-softened material carried on one side of the individual filament to move into substantially complete enveloping relationship with the individual filament.

This application is a continuation of application Ser. No. 777,001 filed on Nov. 19, 1968 and now abandoned.

The present invention relates broadly to the manufacture of continuous filament bodies bearing a heat-softenable material and, more specifically, to method and apparatus for applying a metal coating to continuous filaments of vitreous bodies, e.g., glass.

A variety of techniques, apparatus and methods have been employed in coating glass fibers or filaments with various coatings. The application of heat-softenable materials onto continuously drawn glass filaments presents a number of problems, particularly when it is appreciated that the glass filaments can be and are drawn at extremely high rates of speed, in the neighborhood of 15,000 feet per minute or more. The movement of a filament at this speed results in a film of surrounding air being carried with the filament. This tends to result in a chilling effect which can adversely affect the successful application, to the surface of the glass, of the molten metal since it tends to revert to the solid state upon contact with the cooler air carried by the filaments.

Fairly complicated die arrangements have been employed to provide coatings on filaments. However, in the production of glass strands, the individual filaments drawn at such high speeds are usually in groups of 204 to 408 or more filaments. As a consequence, the employment of individual dies is extremely cumbersome since each individual filament would have to be threaded through the die aperture and, furthermore, in the event of a breakdown, a considerably downtime would be involved in stopping the operation for rethreading of any one or more of the filaments not being satisfactorily coated.

Metal-coated glass filaments are extremely useful materials. The metal-coated fibers are much more abrasion resistant than the bare fibers. It is believed that the improved abrasion resistance in metallized glass fibers occurs by reason of the higher thermo-conductivity of metal compared to glass, permitting removal of heat at a more rapid rate from zones of point contact along the length of abrading fibers. Metal-coated fibers have greater application in use by reason of such higher abrasion resistance, but in addition can be utilized advantageously in the molding of resins wherein the metal on the fibers can be inductively heated for curing or setting of the resin in which the fibers are incorporated during molding. Condensers can also be made of metallized continuous fibers such as by winding alternate layers of a stack of glass fibers with metallized glass fibers. Metallized glass fibers can also be used to reinforce hoses such as petroleum hoses, or can be used to provide anchoring zones in plastic or resin products wherein a concentrated mass of metallized fibers act as spiders in fastening zones which permit threading or more solid anchoring of bolts, screws, or other fastening devices to the product. Aluminum-coated glass filaments are also very useful by reason of the sensitivity of electronic signals to their reflective surface. Large quantities of the aluminum-clad filaments dropped from aircraft serve to screen or confuse radar tracking of the aircraft.

Attempts to produce aluminum-coated glass filaments in commercial quantities have demonstrated the difficulty in obtaining complete surface coverage of all filaments. Less than full surface coverage, of course, adversely affects the performance of the filaments in the particular application of use. Accordingly, it is a prime object of the present invention to provide method and apparatus which permit the manufacture of aluminum-coated glass filaments exhibiting essentially 100% surface coverage by the aluminum.

It is additionally an object of the present invention to provide method and apparatus as will attain the foregoing while at the same time allowing high speed production in terms of the pulling rate of the filaments from the filament-producing bushing.

It is additionally an object of the present invention to provide method and apparatus which in retrospect is of relatively simplified construction as compared to prior art apparatus and techniques known to the present time.

It is still another object of the present invention to provide the aluminum-clad filaments which evidence extreme surface smoothness and uniformity of coating thickness.

The foregoing, as well as other objects of the present invention, will become apparent to those skilled in the art from the following detailed description taken in conjunction with the annexed sheets of drawings on which there is presented, for purposes of illustration only, a single embodiment of the present invention.

In the drawings:

FIG. 3 is a view similar to FIG. 1 but showing only one segment of the moving filaments.

The inventive process and apparatus concerned will be described herein in connection with the coating of glass filaments by aluminum. It shall be appreciated, however, that the particular techniques, the method and the apparatus disclosed will have utility in a broader sense; namely, in the coating of elongate filament or strand-like material with a coating of a material which is heat-softenable. By heat-softenable is meant that the material is capable of existing in the liquid state for purposes of application while liquid and also in the solid state when subjected to a lower temperature usually associated with ambient conditions.

In keeping with the above, it will be appreciated that the filament element need not or is not necessarily limited to glass but can be any one of a number of wire-type materials such as of aluminum, copper or steel or, for that matter, other elongate strand material such as the various synthetic organic materials; for example, nylon, rayon, etc. In place of aluminum, other heat-softenable materials include various metals such as copper, lead, tin, silver and alloys thereof. Furthermore, the heat-softenable material may be any one of a wide variety of thermoplastic materials such as polystyrene, polyethylene, polypropylene, acrylonitrile butadiene styrene copolymers, polycarbonates, polyamides, etc. In a broader sense, thermosetting materials as liquid polymerizates could be applied as liquids to a catalyst bearing filament followed by a heating to convert the coating to the thermoset condition.

Figure 1:
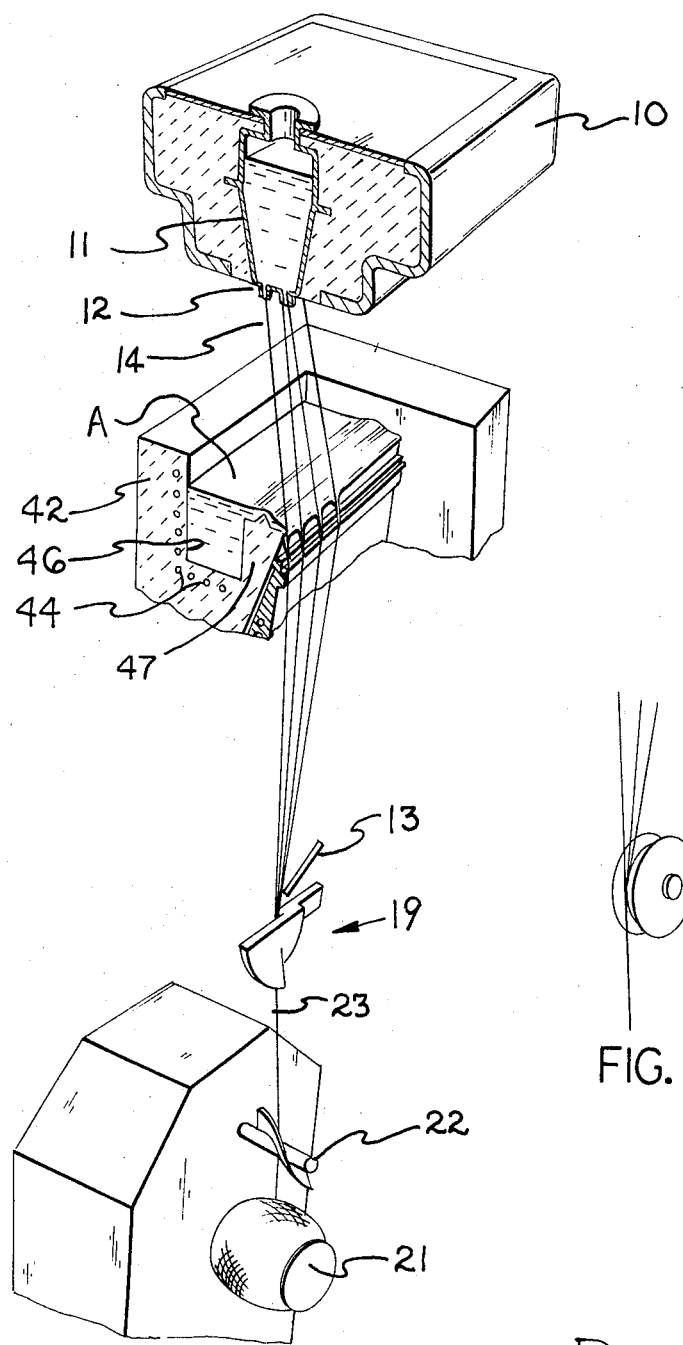
FIG. 1 is a three-quarter perspective view illustrating the employment of the apparatus and the process of the present invention; portions of the apparatus concerned being broken away in the interest of clarity.
Figure 2:
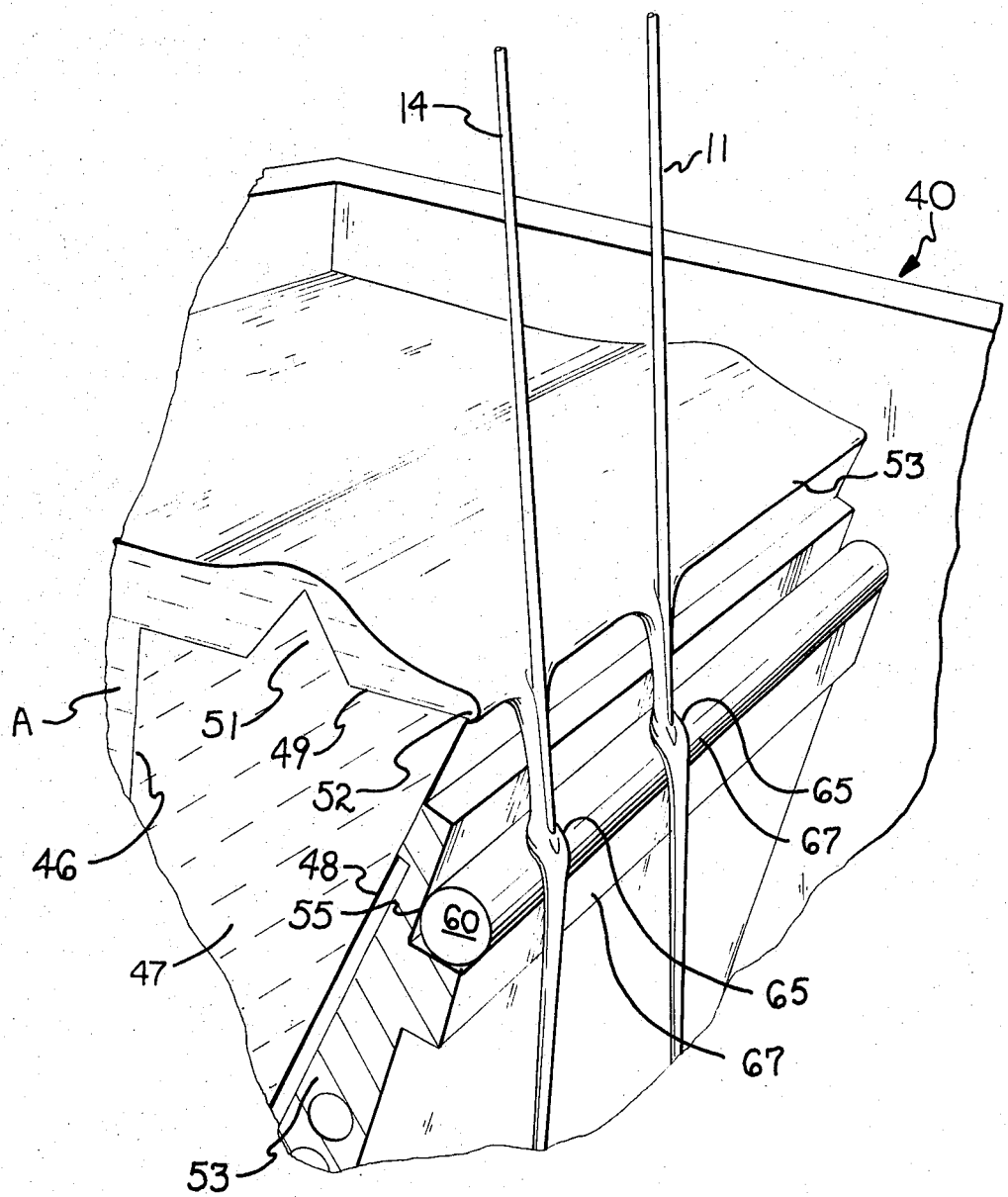
FIG. 2 is likewise a perspective view, similar to FIG. 1, but showing one segment of the apparatus of the present invention greatly enlarged for purposes of illustrating details of construction and also the sequential movement of the filaments therethrough.

Referring now more particularly to the drawings, there is shown in FIG. 1 a general layout of the apparatus for producing fibers or filaments of glass coated, in the present instance, with aluminum. Reference numeral 10 identifies a melter suitable for melting glass. A feeder or bushing 11 is located within the melter and is provided with a series of outlets in its bottom form which flow a plurality of streams of molten glass. The outlets are in the form of projections or tips 12 at the bottom of the feeder and are preferably arranged in several rows so that the streams are substantially in the same plane.

The bushing 11 is made up of high-temperature-resistant conductive material such as platinum surrounded by refractory material retained in a steel casing, as shown. The streams flowing from the outlets, particularly the tips 12, are drawn into fiber form or filaments 14 by means of rotating, collet-supported, collecting tube 21 which winds the fibers thereon in strand form and also provides the pulling force necessary to attenuate the streams into the fine diameter of fiber or filament desired. A gathering member 19 serves to collect the plurality of filaments into a strand 23 and is located in a position intermediate the feeder 11 and the collecting tube 21. The type of gathering member shown in FIG. 1 is commonly termed a pad holder in that in practice it usually supports a felt-like pad of material which acts as a wick to retain sizing or lubricating fluids fed thereto from a source connected to a supply tube 13 having its outlet disposed above the gathering member 19. A brass-gathering spool of the type illustrated in FIG. 3 and having a peripheral groove is frequently preferred as a gathering member for collecting the individual filaments into a unitary strand.

Sizing materials may, of course, be applied separately from the gathering member. Typical sizing materials are described in U.S. Pat. No. 2,234,986. Other lubricants may be more beneficial for strictly metal coatings. Such materials include those of perhaps more lubricating properties such as petroleum oil, vegetable oil, molybdenum disulfide, etc.

The disposition of the strand on the tube 21 to form a package is effected by a suitable traversing means such as a spiral wire traverse 22 arranged upon rotation to sweep the strand material back and forth along the axis of the collection tube with each revolution of the traverse 22.

The apparatus for imparting or applying to the filaments the coating of aluminum is identified by the reference numeral 40 and, as shown, is disposed beneath the feeder 11 and intermediate the feeder and the gathering member 19. The coating apparatus 40 is composed generally of a container-like body 42; in this case, formed of a ceramic or refractory material such as graphite having properties, such as temperature resistance, sufficient to withstand the temperature of the molten aluminum contained therein. Situated within the refractory are a plurality of electrical conductors 44 made of, for example, Nichrome which provide the heat necessary to melt and maintain the molten material within the container at the desired temperature. Other principles of heating may, of course, be employed. The container 42 includes a well or reservoir segment 46 in which is contained the molten aluminum A. One wall 47 of the container is somewhat shorter than the other and includes an upper edge surface 49 having formed thereon an upstanding inverted V-shaped projection 51 which extends along the upper surface of the wall in spaced parallelism with the outer corner edge 52. Outer surface of wall 47 extends reversely inwardly in order to accommodate irregularly shaped refractory member 53 which includes a notch 55 having situated therein a rod member 60 and held by any suitable arrangement. The rod extends in spaced parallelism beneath the edge 52 of the wall 47 and situated generally therebeneath and perhaps slightly inwardly with respect thereto as provided by the inclined surface 48.

The disposition of the applicator structure is such that the multiplicity of filaments drawn from the plurality of outlets 12 proceeds essentially vertically downwardly proximate the corner edge 52 and thence down into contact with the rod 60 and thence slightly inwardly at an angle to the alignment of the filaments proceeding downwardly from the bushing or feeder outlets 12.

This cooperates with the arrangement of the aluminum within the reservoir. The molten aluminum is maintained at a level as will provide, by gravity, a gradual flow of aluminum over the uppermost terminus of the projection 51 toward the edge 52. Furthermore, the arrangement as described, having in mind the viscosity of the molten aluminum at the temperature desired, generally in the range of 1300° F. or higher, together with the inherent surface tension of the aluminum, will result in the aluminum proceeding to the edge 52 and extending slightly therebeyond, forming as it were, a lip, an overhang or meniscus identified by the reference numeral 53. This overhanging lip extends all along the edge 52 of wall 47 and is thereby available for contact by the downwardly proceeding plurality of continuous glass filaments. The contact of the filaments with the overhanging lip in its passage downwardly causes an amount of the aluminum to be picked up along the facing side of the filaments which adheres to the surface of the glass filament which is by nature hydrophylic and receptive to the coating of the molten aluminum along that side. Complete immersion of the filament in the overhanging lip is generally impractical considering the large number of filaments and the difficulty in trying to hold them to a precise location or dimension as would find all of them immersed in the projecting lip which only measures about 3/16 inch. Further, the high speed compounds the difficulty as does the vertical distance. It is therefore more practical to have the filament engage the outer surface of the lip of molten metal. Placement of the applicator such that the filaments definitely contact the lip will find the surface tension resulting in a sort of floating of the filaments on the surface as they pass by.

In accordance with the invention, the partial coverage on the facing surface of the filament is effected as described hereinabove. The partial coverage results in a half-coated filament which proceeds downwardly into contact with the rod member 60 and thence therebelow at a slightly different angle, as illustrated in the drawings. The movement of the half-coated filament against the rod results in the formation of a slight bulge or ball of the aluminum just above the rod or as the filament approaches the rod; said bulge being identified by the reference numeral 65. Almost simultaneously, the slight excess of material represented by the bulge, which is constantly replenished by the descending supply of aluminum borne on the filament, is urged into complete envelopment of the filament or fiber in the manner illustrated and in the region identified generally by the reference numeral 67. It will be appreciated that the now fully-coated filaments are gathered together with or without an appropriate size or lubricating material and wound onto a package as illustrated in FIG. 1. The package may then be further processed by packaging, cutting, combining, etc., as may be desired or required by the particular application to which the metallized filament is to be put.

In the drawings, the path of the individual filaments has been illustrated as being almost exactly vertical. It should be appreciated that the path of the filaments can be at an angle in moving from the lip of molten aluminum to the winder.

The amount of aluminum or other metal applied to the surface of the filament may to an extent be varied by appropriate correlation of adjustment as to the speed of the filament and the viscosity of the alloy and the choice of the alloy. By way of example, using an aluminum alloy of the composition set forth in Table 1 below and identified in the aluminum industry as A1100:

TABLE 1

| | Percent |
|---|---|
| Aluminum | 99 |
| Unspecified (iron and silicon) (maximum) | 1 |
| | 100 | and a linear speed of filament draw of 2800 ft./min., an aluminum thickness of about 0.000125 inch is obtained as determined by an average of a series of measurement of the diameter of a coated filament. The coated filament measured an average of 0.0010 inch in diameter, whereas the uncoated filament measures 0.00075 inch in diameter.

It will be appreciated that the triangle configurated projection serving as a dam allowing flow and formation of the overhanging lamp represents the most basc and therefore most preferred type of configuration for providing the condition making possible the overhang or lip.

Thus, the projection could in theory be in the form of about any geometric shape or contour. Furthermore, instead of an upstanding projection, a groove, ditch or depression in the surface will serve to cooperate with the surface tension in the allowing of flow and the formation of the overhang or lip at the edge of the margin.

Additionally, in the case of a groove or depression in place of the inverted V-shaped dam, it is frequently desirable to have one or more conduits formed in the wall extending communicatingly from the groove or depression to the container reservoir proper. Such a structure will, it can be seen, connect the portion of molten aluminum in the overhang or lip with the molten aluminum in the reservoir and particularly the segment of the aluminum in the reservoir which is below the normal surface. Other arrangements can also be employed to assist in the formation of the overhanging lip which assists in the accomplishments of the several objects of the present invention.

It is a feature of the present invention that the two-stage application for effecting full surrounding coating avoids difficulties in attempting to achieve complete encapsulation or envelopment in a single step with a plurality of extremely fine diameter glass filaments.

While not disclosed herein, it will be appreciated that the level of the molten aluminum within the reservoir, while gradually being lowered due to the removal of molten aluminum in the form of coating, may be conveniently controlled by any one of a variety of suitable automatic control mechanisms inclusive of a level seeking probe controlled to initiate the addition of additional aluminum to the reservoir 46 as the gradually falling level of the molten aluminum approaches the tip of the projection 51.

By way of example, glass fibers can be coated with a variety of compositions of metal. Illustrative of several suitable alloys of aluminum are the following: (1) an alloy of 5% calcium, 95% aluminum; (2) an alloy of 5-10% zinc, 90-95% aluminum; (3) an alloy of 22% copper, 78% aluminum; (4) an alloy of 5% magnesium, 5% zinc, 90% aluminum; (5) an alloy of 20% magnesium, 10% zinc, 70% aluminum; and (6) an alloy of 30% magnesium, 70% aluminum. Alloys of lead which are illustrative of alternative metallic coatings are an alloy of 1-30% zinc, 1.5% cadmium, 68.5-97.5% lead. Other alloys may include, as co-alloying elements, silver, tin, copper, tellurium and antimony.

The rod element 60 is desirably formed of a material which is resistant to the erosive and corrosive effects of the molten metal being applied as further aggravated by the high speed at which the coating is being applied to the rapidly moving glass filaments. Various refractory materials may be employed. The high-temperature-resistant silicate, particularly the magnesium silicates, are particularly efficacious and long lived in such application. The magnesium silicate, mullite, having the formulation $$3Al_2O_3 \cdot 2SiO_2$$

is particularly desirable due to its extremely high melting point of in the neighborhood of just over 1800° C.

It will be appreciated that the employmnet of the circular rod represents a preferred embodiment of the present invention in providing a contact surface. It has also been found that the rod preferably measures from about 1/16 to 1/8 inch in diameter so that the contact of the fibers therewith is quite brief. The contact surface could, of course, be provided by a variety of members either as separate elements of a given configuration or as an integral surface formed in the applicator wall in the region beneath the lip of molten material and transverse to the path of downwardly moving filaments. As indicated, the surface should be such as to involve a very small increment of line contact and should be fabricated of a material refractory to the molten material.

Modifications may be resorted to in the practice of the present invention and all obvious equivalents of specific details of construction and operation are intended to be included within the scope of the claims unless clearly violative thereof.

I claim:
1. A two-stage method of coating elongate filaments of metal, glass or synthetic resin with heat-softenable material having a softening temperature which is less than that which would damage the elongate filaments which comprises:
   (1) drawing a plurality of said elongate filaments downwardly from a supply thereof in spaced, parallel array,
   (2) providing a reservoir of heat-softened material having an exposed overhanging lip thereof along one edge boundary of said reservoir,
   (3) directing said array of filaments en masse downwardly into tangential, non-immersing, surface contact with said lip of heat-softened material, thereby effecting pickup of said material continuously along substantially only one side of the filaments of said array,
   (4) directing said array of filaments en masse with heat-softened material on one side of each filament downwardly and contactingly across an elongate member spaced from said lip and arranged generally transverse to said downward movement of said array and disposed to cause said heat-softened material carried on one side of said individual filament to move into substantially complete enveloping relationship with said individual filament, and
   (5) allowing said fully coated filaments to cool below the softening temperature of said heat-softenable material.
2. The method as claimed in claim 1, wherein said elongate elements are glass filaments.
3. The method as claimed in claim 2, wherein said heat-softenable material is metal.
4. The method as claimed in claim 3, wherein said array of filaments are caused to bend slightly inwardly in proceeding past said elongate member.
5. The method as claimed in claim 4, wherein said contact with the elongate member causes the molten metal carried along one side of the individual filaments to assume a bulge-like configuration just above the point of contact, thereby assisting in the movement of the molten metal then present in said bulge into enveloping relationship with said filaments.

6. The method as claimed in claim 5, wherein said elongate member is formed of refractory material.

7. The method as claimed in claim 6, wherein said metal is aluminum.

8. The method as claimed in claim 3, wherein said metal is aluminum.

9. The method as claimed in claim 8, wherein said elongate member is formed of refractory materials.

10. The method as claimed in claim 8, wherein said contact with the elongate member causes the molten aluminum carried along one side of the individual filaments to assume a bulge-like configuration just above the point of contact, thereby assisting in the movement of the molten aluminum then present in said bulge into enveloping relationship with said filaments.

11. The method as claimed in claim 9, wherein said contact with the elongate member causes the molten metal carried along one side of the individual filaments to assume a bulge-like configuration just above the point of contact, thereby assisting in the movement of the molten metal then present in said bulge into enveloping relationship with said filaments.

12. The method as claimed in claim 9, wherein said array of filaments are caused to bend slightly inwardly in proceeding past said elongate member.

13. The method as claimed in claim 1, wherein said heat-softenable material is a thermosetting resinous material in liquid state and said filament bears a catalyst selected to catalyze polymerization of said thermosetting resin material, converting same to the solid state as an enveloping coating on said filament.

14. A two-stage method of coating glass filaments with aluminum which comprises:
  (1) drawing a plurality of glass filaments downwardly from a supply bushing in horizontally spaced, parallel array,
  (2) providing a reservoir of molten aluminum having an exposed overhanging lip of molten aluminum along one generally linear edge boundary of said reservoir,
  (3) directing said array of filaments en masse downwardly into tangential, non-immersing, surface contact with said lip of molten aluminum, thereby effecting pickup of said aluminum continuously along substantially only one side of the filaments of said array,
  (4) directing said array of filaments en masse with molten aluminum on one side of each filament downwardly and contactingly across an elongate member spaced from said lip and arranged generally transverse to said downward movement of said array and disposed to cause said molten aluminum carried on one side of said individual filament to move into substantially complete enveloping relationship with said individual filament and
  (5) allowing said fully coated filaments to cool below the softening temperature of said molten aluminum.

15. The method as claimed in claim 14, wherein said array of filaments are caused to bend slightly inwardly in proceeding past said elongate member.

16. The method as claimed in claim 14, wherein said contact with the elongate member causes the molten aluminum carried along one side of the individual filaments to assume a bulge-like configuration just above the point of contact, thereby assisting in the movement of the molten aluminum then present in said bulge into enveloping relationship with said filaments.

17. The method as claimed in claim 14, wherein said elongate member is formed of refractory material.

18. The method as claimed in claim 15, wherein said contact with the elongate member causes the molten aluminum carried along one side of the individual filaments to assume a bulge-like configuration just above the point of contact, thereby assisting in the movement of the molten aluminum then present in said bulge into enveloping relationship with said filaments.

19. The method as claimed in claim 18, wherein said elongate member is formed of refractory material.

References Cited
UNITED STATES PATENTS

| | | | |
|---|---|---|---|
| 3,310,455 | 3/1967 | Warthen | 117—126 GM |
| 2,861,393 | 11/1958 | Whitehurst et al. | 117—126 GM |
| 2,976,177 | 3/1961 | Warthen | 117—126 GM |
| 3,231,459 | 1/1966 | Warthen | 117—126 GM |
| 2,782,563 | 2/1957 | Russell | 117—126 GM |
| 2,980,956 | 4/1961 | Whitehurst et al. | 117—126 GM |
| 3,126,608 | 3/1964 | Whitehurst | 117—126 GM |
| 3,473,950 | 10/1969 | Wong | 117—72 |
| 3,498,826 | 3/1970 | Caroselli et al. | 117—72 |
| 3,508,950 | 4/1970 | Marzocchi | 117—72 |
| 3,556,844 | 1/1971 | Marzocchi | 117—72 |
| 3,583,882 | 6/1971 | Bartrug | 117—72 |
| 3,591,357 | 7/1971 | Janetos et al. | 117—72 |

WILLIAM D. MARTIN, Primary Examiner

M. SOFOCLEOUS, Assistant Examiner

U.S. Cl. X.R.

117—126 GQ, GB, 128, 120, 128.7, 131, 138.8 A, N, 231, 232, 233; 118—123, 420, DIG 19; 156—166, 167